United States Patent
Jamison

(10) Patent No.: US 6,537,103 B2
(45) Date of Patent: Mar. 25, 2003

(54) ADAPTABLE CONDUIT CONNECTOR ASSEMBLY

(75) Inventor: William H. Jamison, Covington, VA (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/862,706

(22) Filed: May 23, 2001

(65) Prior Publication Data

US 2002/0177349 A1 Nov. 28, 2002

(51) Int. Cl.$^7$ ................................................. H01R 13/58
(52) U.S. Cl. ........................................ 439/452; 439/470
(58) Field of Search ................................. 439/452, 719, 439/458, 459, 463, 464, 470, 471, 472

(56) References Cited

U.S. PATENT DOCUMENTS

| | | | |
|---|---|---|---|
| 240,736 A | 4/1881 | Leeds | |
| 1,531,423 A | 3/1925 | Simpson | |
| 2,128,040 A | 8/1938 | Conners | |
| 4,012,578 A | 3/1977 | Moran et al. | |
| 4,021,092 A | * 5/1977 | Ericson, Jr. | ............... 439/472 |
| 4,021,604 A | 5/1977 | Dola et al. | |
| 4,880,387 A | 11/1989 | Stikeleather et al. | |
| 4,990,102 A | * 2/1991 | Myers | ............... 439/452 |
| 5,132,493 A | 7/1992 | Sheehan | |
| 5,174,768 A | * 12/1992 | Hewison et al. | ............... 174/51 |
| 5,189,258 A | 2/1993 | Pratesi | |
| 5,422,437 A | 6/1995 | Schnell | |
| 5,539,152 A | 7/1996 | Gretz | |
| 5,681,180 A | * 10/1997 | Rodrigues | ............... 439/404 |
| 5,731,543 A | 3/1998 | Jorgensen | |
| 5,867,392 A | * 2/1999 | Bousquet | ............... 700/134 |
| 6,080,933 A | 6/2000 | Gretz | |
| 6,113,420 A | * 9/2000 | Harting et al. | ............... 439/407 |
| 6,203,362 B1 | * 3/2001 | Tsuji | ............... 439/470 |
| 6,231,392 B1 | * 5/2001 | van Woensel | ............... 439/353 |

OTHER PUBLICATIONS

SC Power Connectors Brochure, Molex Incorporated Industrial Division; prior to May 23, 2001.
Molex Modular Connector System Brochure, Molex Industrial Division, Jun. 1998.

* cited by examiner

*Primary Examiner*—Tho D. Ta
*Assistant Examiner*—Edwin A. León
(74) *Attorney, Agent, or Firm*—Alfred N. Goodman; Mark S. Bicks; Tara L. Hoffman

(57) ABSTRACT

A connector assembly that includes an L-shaped bracket having first and second portions. The first portion has an electrical connector coupling surface, and the second portion has a conduit coupling surface. A conduit connector is coupled by a snapping engagement to the second portion of the bracket at the conduit coupling surface. A flexible conduit member is supported by the conduit connector.

17 Claims, 3 Drawing Sheets

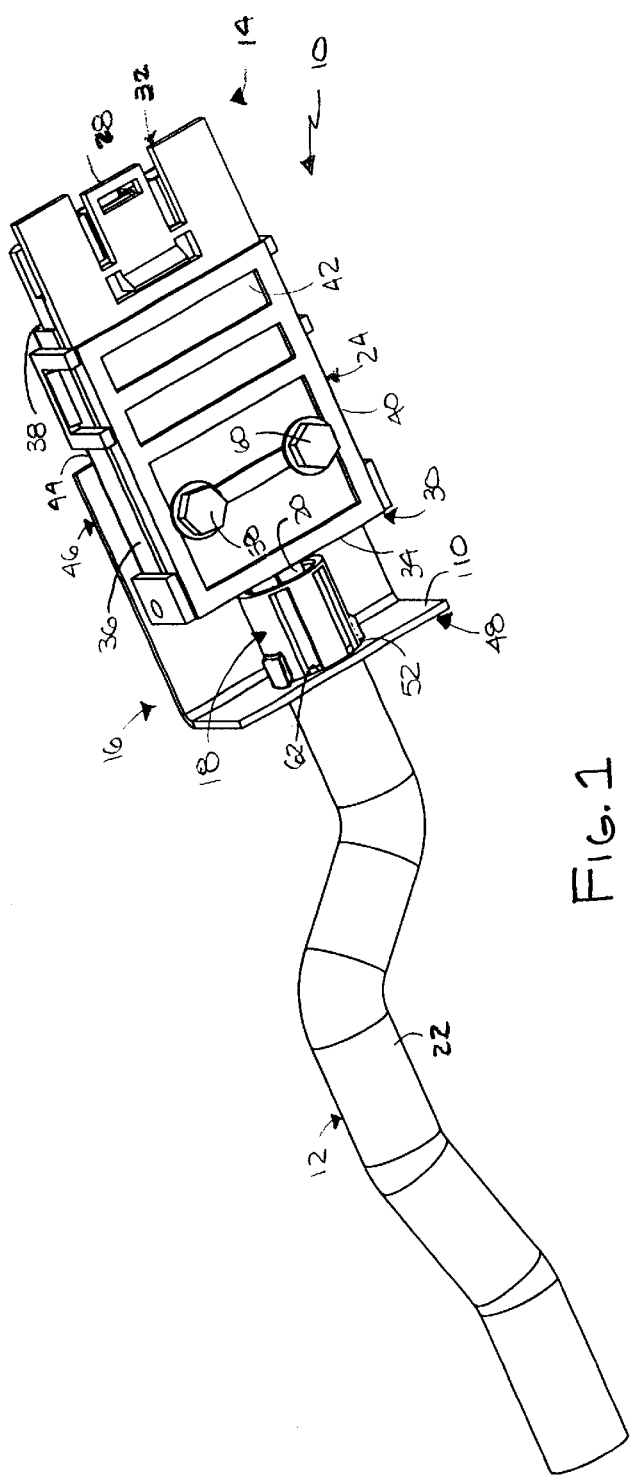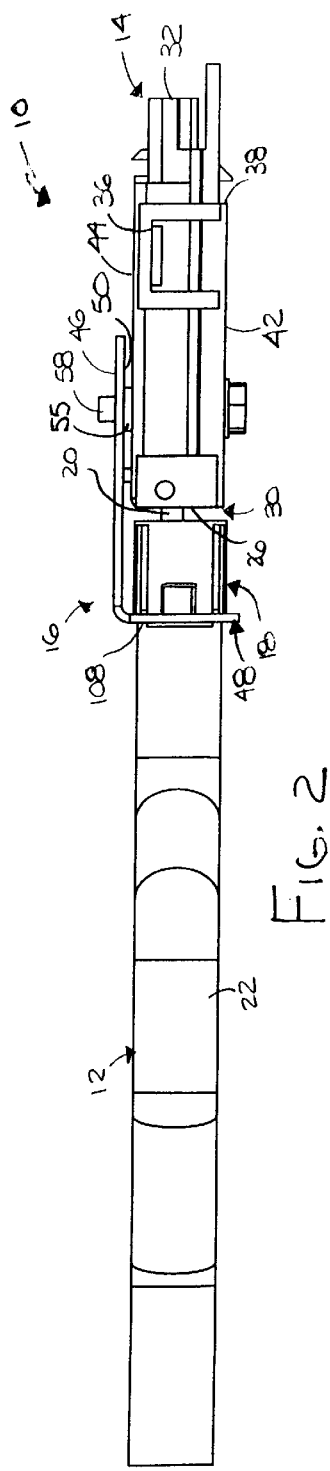

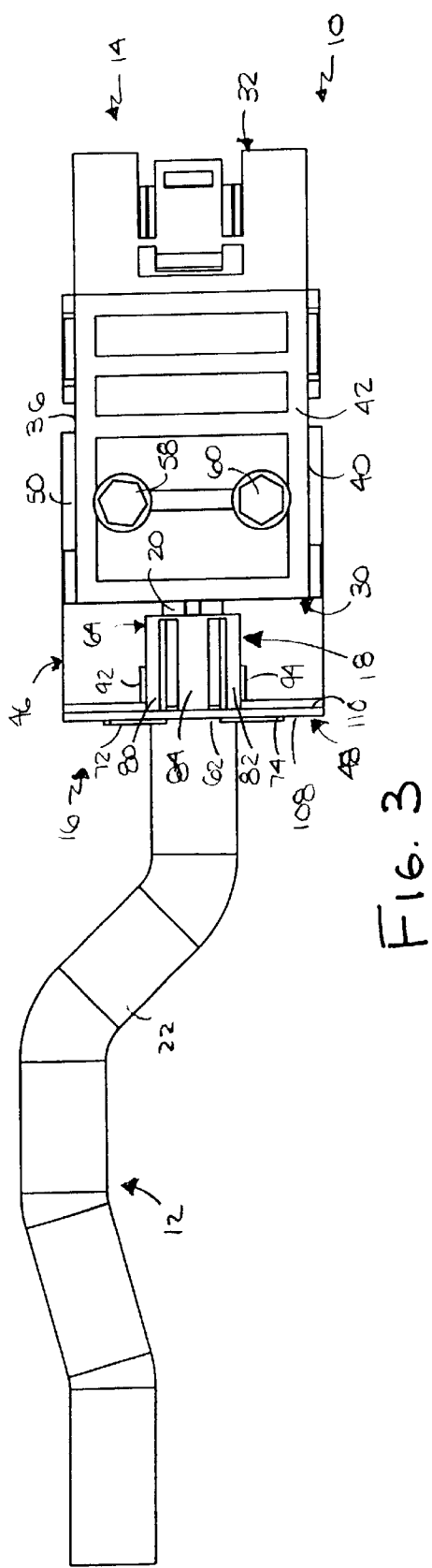
Fig. 3
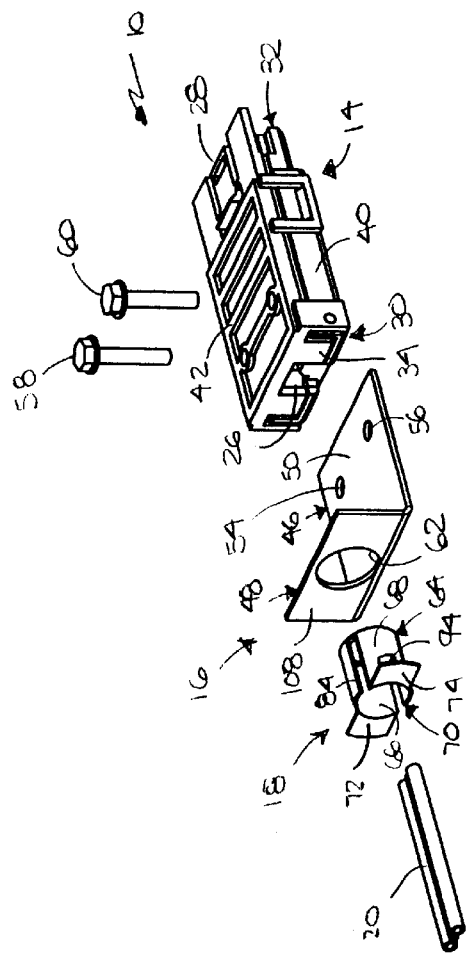
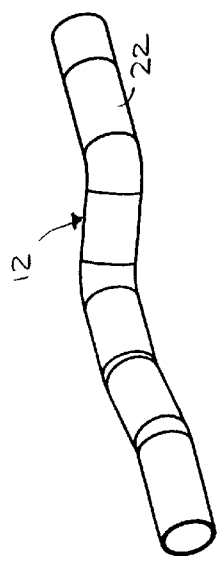
Fig. 4

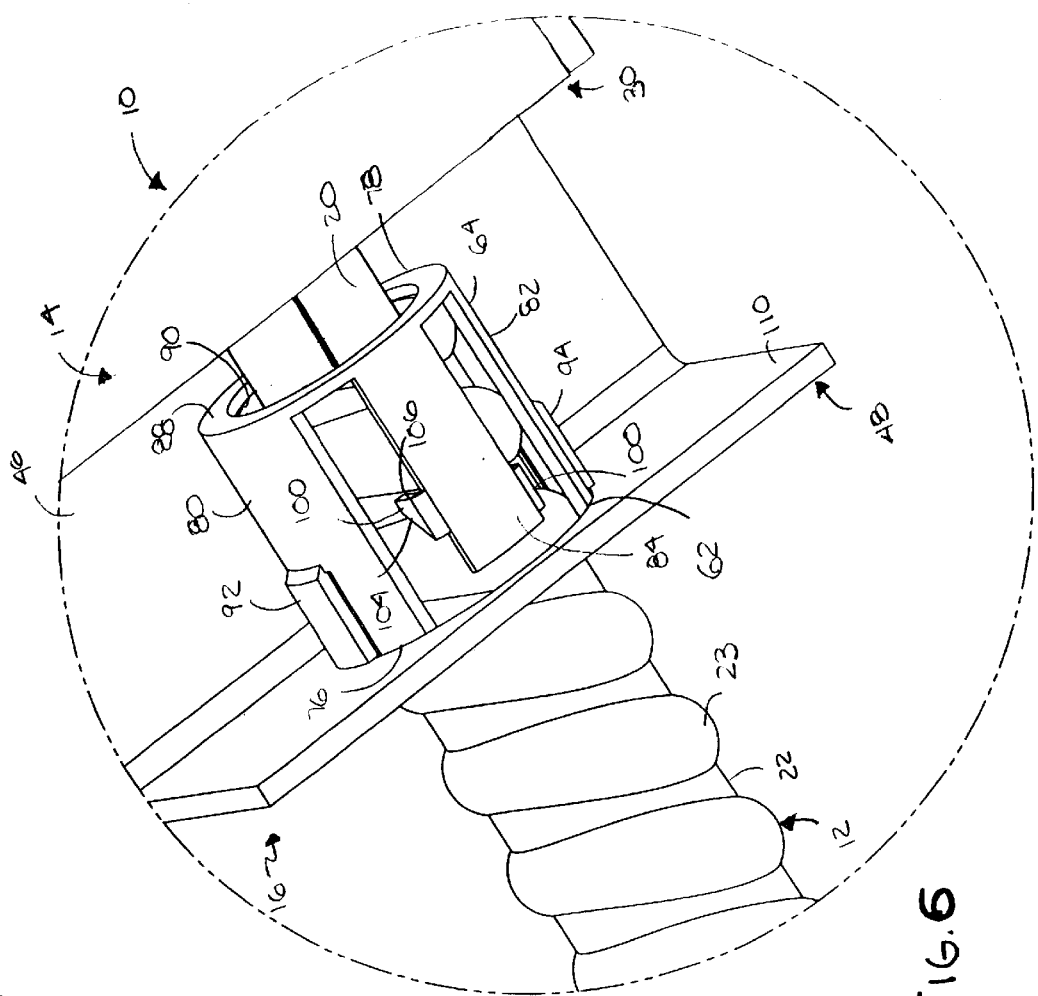
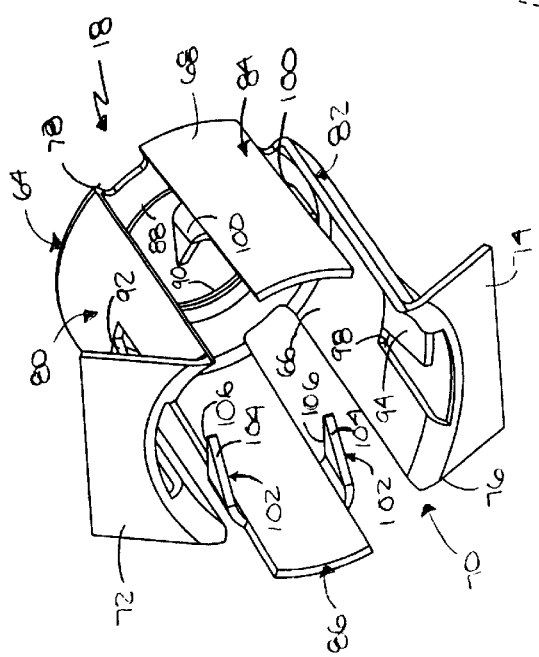

ADAPTABLE CONDUIT CONNECTOR ASSEMBLY

FIELD OF THE INVENTION

The present invention generally relates to a connector assembly for connecting electrical conduit to an electrical connector. More specifically, the present invention relates to an adaptable connector assembly that allows flexible conduit to be connected to any type of electrical connector, including those connectors not normally suited to receive conduit.

BACKGROUND OF THE INVENTION

Conventional conduct connectors provide a mechanism for connecting conduit to an electrical device. Electrical conduit includes a flexible tubular conduit housing that supports and encloses multiple electrical wires providing protection for the wires. Conventional electrical conduit connectors typically comprise a clipping member that engages an electrical device, thereby allowing the conduit and wires to be electrically connected to the device. For example, a typical junction box includes at least one aperture for receiving a conventional clipping member supporting a conduit member, with the clip and conduit extending into the junction box for electrical connection thereto.

Some electrical devices are adapted to receive only electrical wires or cable and cannot receive electrical conduit due to the size and nature of the conduit housing. In particular, electrical connectors such as crossover and power connectors do not provide a mechanism for connecting electrical conduit, rather than just electrical wires. Therefore, these types of electrical connectors cannot be used with electrical conduit without substantially altering the electrical connectors or replacing the electrical connectors. No known conventional conduit connectors are adaptable to electrical connectors not suited to received flexible conduit. The conventional conduit connectors instead can only be used with one type of electrical connector.

Examples of conventional conduit connectors are disclosed in U.S. Pat. No. 1,531,423 to Simpson; U.S. Pat. No. 2,128,040 to Conners; U.S. Pat. No. 4,012,578 to Moran et al.; U.S. Pat. No. 4,021,604 to Dola et al.; U.S. Pat. No. 4,880,387 to Stikeleather et al.; U.S. Pat. No. 5,132,493 to Sheehan; U.S. Pat. No. 5,422,437 to Schnell; U.S. Pat. No. 5,539,152 to Gretz; U.S. Pat. No. 5,731,543 to Jorgensen; and U.S. Pat. No. 6,080,933 to Gretz.

SUMMARY OF THE INVENTION

Accordingly, an object of the present invention is to provide a conduit connector assembly that allows flexible electrical conduit to be connected to any electrical connector.

Another object of the present invention is to provide a conduit connector assembly that provides a mechanism for connecting electrical conduit to electrical connectors without altering or replacing the connector.

Yet another object of the present invention is to provide a conduit connector assembly that provides a simple and inexpensive mechanism for connecting electrical conduit to electrical connectors.

The foregoing objects are basically attained by a connector assembly that includes an L-shaped bracket having first and second portions, the first portion having an electrical connector coupling surface, and the second portion having a conduit coupling surface. A conduit connector is coupled by a snapping engagement to the second portion of the bracket at the conduit coupling surface. A flexible conduit member is supported by the conduit connector.

The foregoing objects are also attained by a connector assembly that includes an L-shaped bracket having first and second portions. The first portion has an electrical connector coupling surface, and the second portion has a conduit coupling surface. A conduit connector is coupled by a snapping engagement to the second portion of the bracket at the conduit coupling surface. An electrical connector has first and second sides, the first side being coupled to the first portion of the bracket at the electrical connector coupling surface and the second side being spaced from said second portion of the bracket. A flexible conduit member is supported by the conduit connector and electrically connected to the electrical connector proximate the second side of the electrical connector.

By fashioning the connector assembly in the above manner, electrical conduit can be connected to any electrical connector simply and inexpensively and without altering the electrical connector. This is particularly true for cross-over, modular or power type electrical connectors, which were not previously usable with flexible conduits.

Other objects, advantages and salient features of the invention will become apparent from the following detailed description, which, taken in conjunction with annexed drawings, discloses a preferred embodiment of the present invention.

BRIEF DESCRIPTION OF THE DRAWINGS

Referring to the drawings which form a part of this disclosure:

FIG. 1 is a top perspective view of a conduit connector assembly in accordance with an embodiment of the present invention showing connection of a flexible conduit and an electrical connector;

FIG. 2 is a side elevational view of the conduit connector assembly illustrated in FIG. 1;

FIG. 3 is a top plan view of the conduit connector assembly illustrated in FIG. 1;

FIG. 4 is an exploded perspective view of the conduit connector assembly illustrated in FIG. 1;

FIG. 5 is an enlarged perspective view of the conduit connector of the connector assembly illustrated in FIG. 1; and FIG. 6 is an enlarged partial perspective view of the conduit connector assembly illustrated in FIG. 1 showing a conduit connector of the assembly engaged with the conduit member and a bracket of the assembly.

DETAILED DESCRIPTION OF THE INVENTION

Referring to FIGS. 1–6, an adaptable conduit connector assembly 10 for connecting a flexible electrical conduit member 12 to an electrical connector 14 in accordance with the present invention includes a bracket 16 and conduit connector 18. Connector assembly 10 adapts to any type of electrical connector. Thus, connector assembly 10 provides a strain relief connection between flexible conduit 12 and any type of connector, including those not suited to receive a conduit member and without having to alter or replace the electrical connector.

Flexible conduit 12 provides a casing 22, with outer ribs 23, for enclosing electrical wires 20 to be connected to electrical connector 14, as is well known in the art. Electrical connector 18 is preferably a modular connector, such as a MOLEX connector well known in the art, but can be any type of electrical connector. Since these electrical connectors are well known, electrical connector 14 will be described only generally.

Electrical connector 14 includes a housing 24 with first and second inputs 26 and 28 disposed on opposite ends 30 and 32 of electrical connector 14, respectively. First input 26 receives electrical wires and allow the multiple wires received therein to be connected within the connector housing 24. Second input 28 connects to another electrical device or connector (not shown). Connector housing 24 generally includes first, second, third, and fourth sides 34, 36, 38, and 40, with top and bottom walls 42 and 44 connecting the sides 34, 36, 38, and 40. Sides 34, 36, 38, and 40 and walls 42 and 44 are dimensioned to form a substantially rectangular shaped housing 24, as seen in FIG. 1.

Bracket 16 is generally L-shaped and includes substantially planar first and second portions 46 and 48. First portion 46 attaches to electrical connector 14 at an electrical connector coupling surface 50. Second portion 48 is coupled to conduit connector 18 and conduit 12 at a conduit coupling surface 52. First and second portions 46 and 48 are generally perpendicular having about the same width and different lengths, respectively, with first portion 46 being longer that second portion 48, as best seen in FIGS. 1 and 4.

At the electrical connector coupling surface 50 of first portion 46, fasteners holes 54 and 56 are disposed in portion 46. In particular, holes 54 and 56 are located near the distal end 58 of first portion 46 remote from second portion 48. Although two fastener holes are preferred, any number of holes can be employed including only a single hole. Holes 54 and 56 are adapted and sized to receive fasteners 58 and 60.

Centrally disposed on second portion 48, is an aperture 62 that receives both flexible conduit 12 and conduit connector 18. Aperture 62 is preferably only slightly larger that conduit connector 18 and conduit 12. Although bracket 16 is preferably a one-piece unitary member, first and second portions 46 and 48 can be made separately and integrally attached. Bracket 16 is preferably made of a substantially rigid material such as metal.

Conduit connector 18 couples flexible conduit 12, such are armor, to bracket 16. Conduit connector 18 includes a main hollow tubular body 64 with inner and outer surfaces 66 and 68 and an inner area 70 for supporting conduit 12. First and second stopping arms 72 and 74 extend from a first open end 76 of body 64 opposite a second open end 78. Connector body 64 particularly includes first, second, third, and fourth resilient fingers 80, 82, 84, and 86 with stopping arms 72 and 74 extending outwardly from first and second fingers 80 and 82, respectively, as seen in FIG. 5. Opposite arms 72 and 74, an end wall 88 with a central opening 90 defines second open end 78 of connector body 64.

Conduit connector first and second fingers 80 and 82 include first and second snapping members 92 and 94 and first and second openings 96 and 98, respectively. Each snapping member 92 and 94 flares outwardly from main body 64. Snapping members 92 and 94 are resilient and can flex into first and second openings 96 and 98 of members 92 and 94, respectively, and away from members 92 and 94.

Each of third and fourth fingers 84 and 86 include a pair of inwardly extending gripping members 100 and 102 for gripping flexible conduit 12, as best seen in FIGS. 5 and 6. Gripping members 100 and 102 grab ribs 23 of conduit casing 22 when inserted through first open end 76 of conduit connector 18 through to second open end 78. In grabbing conduit ribs 23, gripping members 100 and 102 generally prevent conduit 12 from being removed back through first open end 76 (i.e., provide strain relief). In particular, each gripping member 100 and 102 has a generally triangular shape and includes a surface 104 slanted inwardly and toward second open end 78 of body 64 and a top flat surface 106, as best seen in FIG. 5. Surface 104 of each gripping member 100 and 102 allows flexible conduit 12 to pass through inner area 70 from first open end 76 with top surfaces 106 catching on conduit ribs 23 thereby substantially preventing conduit 12 from being pulled back through first opening 76.

Assembly

As seen in FIGS. 1–6, flexible conduit 12 is connected to electrical connector 14 using connector assembly 10. Specifically, bracket 16 is attached to electrical connector 14 at its connector coupling surface 50 by attaching first bracket portion 46 to electrical connector 14 using fasteners 58 and 60 inserted through connector 14 and bracket holes 54 and 56, as seen in FIGS. 2 and 4. Fasteners 58 and 60 are tightened until first bracket portion 46 is only slightly spaced from bottom wall 44 of electrical connector 14, as best seen in FIG. 2, due to a boss 55 located therebetween. Also, second bracket portion 48 will be spaced from the end 30 of electrical connector 14 so that conduit connector 18 can be accommodated between second bracket portion 46 and electrical connector 14, as seen in FIG. 1.

Flexible conduit 12 is attached to conduit connector 18. In particular, flexible conduit 12 is inserted into inner area 70 of conduit connector 18 from first open 76 through to second open end 78 until conduit 12 abuts end wall 88. Wires 20 of conduit 12 extend through opening 90 in end wall 88. Since conduit connector fingers 84 and 86 and their gripping members 100 and 102 are flexible and resilient, conduit 12 slides past slanted surfaces 104 of gripping members 100 and 102 until their top surfaces 106 catch conduit ribs 23, as best seen in FIG. 6.

Conduit connector 18 and conduit 12 are attached to second bracket portion 48 at its conduit coupling surface 52. In particular, conduit connector 18 is snapped into the central aperture 62 of second bracket portion 48. As seen in FIGS. 3 and 6, conduit connector 18 extends through aperture 62 until stopping arms 72 and 74 abut second portion 48 at a first surface 108 facing away from electrical connector 14. Also, outwardly extending snapping members 92 and 94 and fingers 80 and 82 flex inwardly when inserted through aperture 62 given the resilient nature of connector 18. As seen in FIG. 6, once snapping members 92 and 94 pass through aperture 62, snapping members 92 and 94 spring outwardly returning to their extended positions catching second bracket portion 48 at a second surface 110 facing the electrical connector 14. Wires 20 of conduit 12 can then be inserted into first input 26 at end 30 of electrical connector 14. Conduit connector 18 is preferably slightly spaced from end 30 of electrical connector 14, as seen in FIG. 6, but can abut end 30.

In connecting flexible conduit 12 and electrical connector 14, bracket 16 and conduit connector 18 can be assembled in any order. For example, bracket 16 can first be coupled with electrical connector 14, as described above, and then conduit 12 and conduit connector 16 can be attached to bracket 16. Alternatively, conduit 12 and conduit connector 18 can be connected to bracket 16 and then the bracket 16 is connected to electrical connector 14.

While a particular embodiment has been chosen to illustrate the invention, it will be understood by those skilled in the art that various changes and modifications can be made therein without departing from the scope of the invention as defined in the appended claims.

What is claimed is:

1. A connector assembly, comprising:
an L-shaped bracket having first and second portions, said first portion having an electrical connector coupling surface coupled to a crossover electrical connector, and said second portion having a conduit coupling surface; and
a conduit connector coupled by a snapping engagement to said second portion of said bracket at said conduit coupling surface; and
a flexible conduit member supported by said conduit connector and electrically connected to said electrical connector.

2. A connector assembly according to claim 1, wherein
said electrical connector coupling surface is an aperture in said second portion of said bracket; and
said conduit connector is received in said aperture.

3. A connector assembly according to claim 1, wherein
a fastener member extends through said first portion of said bracket and said electrical connector, thereby coupling said bracket and said electrical connector.

4. A connector assembly according to claim 1, wherein
said conduit member includes a plurality of wires connected to said electrical connector.

5. A connector assembly according to claim 1, wherein
said first and second portions of said bracket are substantially perpendicular to one another; and
said first portion is substantially longer than said second portion.

6. A connector assembly, comprising:
an L-shaped bracket having first and second portions, said first portion having an electrical connector coupling surface coupled to an electrical connector, said second portion having a conduit coupling surface, said electrical connector including first and second perpendicular sides with said first portion of said bracket being coupled to said first side and said second portion of said bracket being spaced from said second side;
a conduit connector coupled by a snapping engagement to said second portion of said bracket at said conduit coupling surface; and
a flexible conduit member supported by said conduit connector and electrically connected to said electrical connector.

7. A connector assembly according to claim 6, wherein
said conduit connector includes a tubular body that receives said conduit member, at least one resilient finger that provides said snapping engagement, and at least one stopping arm for abutting said bracket.

8. A connector assembly according to claim 7, wherein
said resilient finger engages a first surface of said second portion of said bracket; and
said support engages a second surface opposite said first surface of said second portion of said bracket, thereby maintaining the engagement between said conduit member and said bracket second portion.

9. A connector assembly, comprising:
an L-shaped bracket having first and second portions, said first portion having an electrical connector coupling surface, and said second portion having a conduit coupling surface;
a conduit connector coupled by a snapping engagement to said second portion of said bracket at said conduit coupling surface;
an electrical connector having first and second sides, said first side being coupled to said first portion of said bracket at said electrical connector coupling surface, said second side being spaced from said second portion of said bracket; and
a flexible conduit member supported by said conduit connector and electrically connected to said electrical connector proximate said second side of said electrical connector.

10. A connector assembly according to claim 9, wherein
said conduit connector is located proximate said second side of said electrical connector.

11. A connector assembly according to claim 9, wherein
said conduit member includes a plurality of wires for electrically connecting said conduit member to said electrical connector.

12. A connector assembly according to claim 9, wherein
said first and second portions of said bracket form a substantially L-shaped bracket; and said first side of said electrical connector is substantially perpendicular to said second side.

13. A connector assembly according to claim 9, wherein
a plurality of fasteners extend through said first portion of said bracket and said first side of said electrical connector, thereby coupling said bracket and said electrical connector.

14. A connector assembly according to claim 9, wherein
said electrical connector coupling surface of said second portion of said bracket is an aperture; and
said conduit connector is received in said aperture.

15. A connector assembly according to claim 14, wherein
said conduit connector includes a tubular body that receives said conduit member, at least one resilient finger that provides the snapping engagement with said bracket, and at least one support arm for abutting said bracket.

16. A connector assembly according to claim 9, wherein
said electrical connector is a modular electrical connector.

17. A connector assembly according to claim 16, wherein
said conduit member includes a plurality of wires connected to said electrical connector.

* * * * *